(12) United States Patent
Brissette et al.

(10) Patent No.: US 11,695,592 B2
(45) Date of Patent: *Jul. 4, 2023

(54) SEGMENTATION WITHIN A BROADCAST DOMAIN IN ETHERNET VPN

(71) Applicant: Cisco Technology, Inc., San Jose, CA (US)

(72) Inventors: Patrice Brissette, Gatineau (CA); Samir Thoria, Saratoga, CA (US); Ali Sajassi, San Ramon, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 221 days.

This patent is subject to a terminal disclaimer.

(21) Appl. No.: 17/103,588

(22) Filed: Nov. 24, 2020

(65) Prior Publication Data

US 2021/0083903 A1 Mar. 18, 2021

Related U.S. Application Data

(63) Continuation of application No. 16/438,844, filed on Jun. 12, 2019, now Pat. No. 10,880,123.

(51) Int. Cl.
*H04L 12/28* (2006.01)
*H04L 12/54* (2022.01)
*H04L 12/66* (2006.01)
*H04L 12/46* (2006.01)
*H04L 12/70* (2013.01)

(52) U.S. Cl.
CPC .......... *H04L 12/56* (2013.01); *H04L 12/4641* (2013.01); *H04L 12/66* (2013.01); *H04L 2012/5641* (2013.01); *H04L 2012/5642* (2013.01); *H04L 2012/5648* (2013.01)

(58) Field of Classification Search
None
See application file for complete search history.

(56) References Cited

U.S. PATENT DOCUMENTS

| 10,880,123 | B1* | 12/2020 | Brissette | H04L 45/16 |
| 2017/0063600 | A1* | 3/2017 | Singh | H04L 12/18 |
| 2018/0077050 | A1* | 3/2018 | Tiruveedhula | H04L 45/18 |
| 2019/0028328 | A1* | 1/2019 | Tessmer | H04L 41/40 |

* cited by examiner

*Primary Examiner* — Clemence S Han
(74) *Attorney, Agent, or Firm* — Baker Botts L.L.P.

(57) ABSTRACT

In one embodiment, a method includes receiving a broadcast, unknown-unicast, or multicast (BUM) frame from a connected device, where the BUM frame is associated with a broadcast domain, determining a segment within the broadcast domain associated with the device, adding to the BUM frame a segment identifier that uniquely identifies the segment within the broadcast domain, and causing the BUM frame to be delivered to one or more recipient network apparatuses in a network associated with the broadcast domain, where the segment identifier added to the BUM frame is configured to be used by the one or more recipient network apparatuses to selectively forward the BUM frame to connected devices that are associated with segment identifier.

20 Claims, 7 Drawing Sheets

```
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 | Type=0x06     | Sub-Type=TBD  | Flags(1 Octet)| Segment-id    |
 +-+-+-+-+-+-+-+-+-+-+-+-+-+-+-+-+-+-+-+-+-+-+-+-+-+-+-+-+-+-+-+-+
 | Segment-id    | Leaf/root Label                               |
 +-+-+-+-+-+-+-+-+-+-+-+-+-+-+-+-+-+-+-+-+-+-+-+-+-+-+-+-+-+-+-+-+
                              Extended Community The Flags field has the following format:

0 1 2 3 4 5 6 7
 +-+-+-+-+-+-+-+-+
 | reserved    |L|
 +-+-+-+-+-+-+-+-+
```

*FIG. 2*

| (a) PE1 | (b) PE2 | (c) PE3 | (d) PE4 |
|---|---|---|---|
| M1 -> AC1 (seg-id 10) | M1 -> PE1 (seg-id 10) | M1 -> PE1 (seg-id 10) | M1 -> PE1 (seg-id 10) |
| M2 -> PE2 (seg-id 10) | M2 -> AC2 (seg-id 10) | M2 -> PE2 (seg-id 10) | M2 -> PE2 (seg-id 10) |
| M3 -> PE3 (seg-id 20) | M3 -> PE3 (seg-id 20) | M3 -> AC3 (seg-id 20) | M3 -> PE3 (seg-id 20) |
| M4 -> PE4 (seg-id 20) | M4 -> PE4 (seg-id 20) | M4 -> PE4 (seg-id 20) | M4 -> AC4 (seg-id 20) |
| M5 -> PE2 (seg-id 30) | M5 -> AC5 (seg-id 30) | M5 -> PE2 (seg-id 30) | M5 -> PE2 (seg-id 30) |

*FIG. 3*

SEGMENTATION WITHIN A BROADCAST DOMAIN IN ETHERNET VPN

PRIORITY

This application is a continuation under 35 U.S.C. § 120 of U.S. patent application Ser. No. 16/438,844, filed 12 Jun. 2019.

TECHNICAL FIELD

The present disclosure relates generally to a field of data communications, and more particularly, to segmenting a broadcast domain in a network providing an ethernet connectivity between sites.

BACKGROUND

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as software-defined local area networks (SD-LANs) and software-defined wide area networks (SD-WANs), and virtual networks such as virtual LANs (VLANs) and virtual private networks (VPNs).

BRIEF DESCRIPTION OF THE DRAWINGS

FIG. 2 illustrates an example format for a Border Gateway Protocol (BGP) extended community.

FIG. 3 illustrates example tables constructed at network apparatuses based on control plane information.

FIG. 6 illustrates an example method for selectively forwarding a BUM frame to connected devices being associated with the segment that the BUM frame is associated with.

DESCRIPTION OF EXAMPLE EMBODIMENTS

Overview

Figure 1:
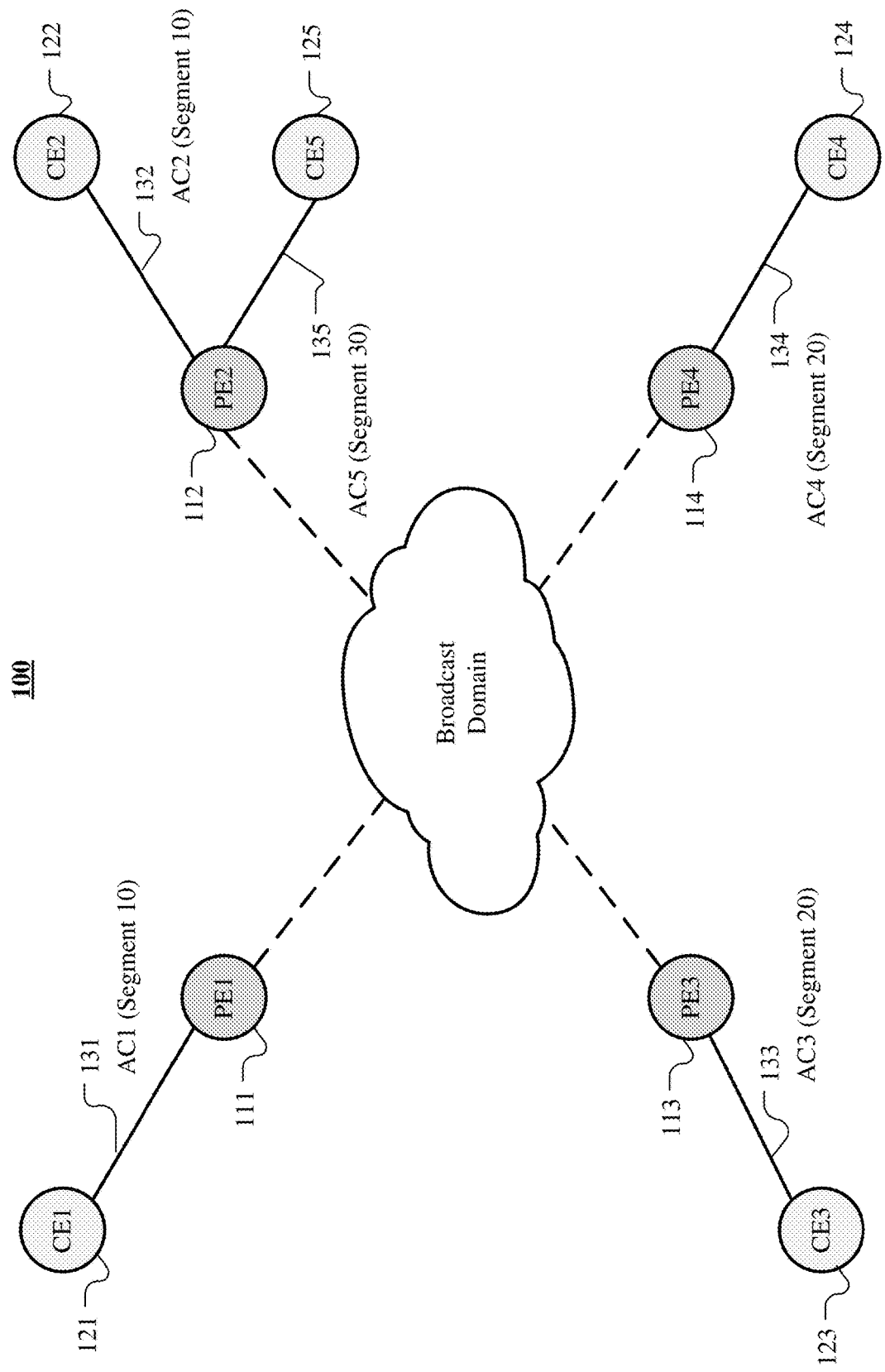
FIG. 1 illustrates an example EVPN network that allows segmentations with a broadcast domain.

In particular embodiments, a network apparatus may receive a broadcast, unknown-unicast, or multicast (BUM) frame from a device connected to the network apparatus. The BUM frame may be associated with a broadcast domain. The network apparatus may determine a first segment within the broadcast domain associated with the device. The network apparatus may add a first segment identifier that uniquely identifies the first segment within the broadcast domain to the BUM frame. The network apparatus may cause the BUM frame to be delivered to one or more recipient network apparatuses in a network associated with the broadcast domain. The first segment identifier added to the BUM frame may be configured to be used by the one or more recipient network apparatuses to selectively forward the BUM frame to connected devices that are associated with first segment identifier.

In particular embodiments, a network apparatus may receive a broadcast, unknown-unicast, or multicast (BUM) frame originated from a source network apparatus. The BUM frame may be associated with a broadcast domain. The BUM frame may comprise a segment identifier identifying a segment within the broadcast domain. The network apparatus may compare the segment identifier of the BUM frame to one or more second segment identifiers of one or more devices connected to the network apparatus. The network apparatus may forward a copy of the BUM frame to any of the one or more devices if the second segment identifier associated with that device matches the segment identifier of the BUM frame.

EXAMPLE EMBODIMENTS

A broadcast domain is a logical division of a computer network, in which all nodes can reach each other by broadcast at the data link layer. A broadcast domain can be within the same LAN segment or it can be bridged to other LAN segments. In a bridged network, the broadcast domain may correspond to a VLAN, where a VLAN is typically represented by a single VLAN ID (VID) and also can be represented by several VIDs where Shared VLAN Learning (SVL) is used. An Ethernet Virtual Private Network (EVPN) may connect dispersed sites using a Layer 2 virtual bridge. An EVPN consists of customer edge (CE) devices (host, router, or switch) connected to provider edge (PE) nodes. Throughout this disclosure, a device may refer to a CE device, and a network apparatus may refer to a PE node. An Attachment Circuit (AC) is a physical or logical circuit between a PE and a CE. An EVPN Instance (EVI) may be an EVPN routing and forwarding instance spanning the PE devices participating in that EVPN. An EVI is configured on the PEs on a per-customer basis. Each PE node in an EVPN network may maintain a Virtual Routing and Forwarding table for Media Access Control (MAC) addresses (MAC-VRF). A bridge table may an instantiation of a broadcast domain on a MAC-VRF. When a customer site (device or network) is connected to one or more PEs via a set of Ethernet links, then that set of links may be referred to as an Ethernet Segment (ES). An Ethernet Segment Identifier (ESI) may be a unique non-zero identifier that identifies an ES. An Ethernet Tag may identify a particular broadcast domain, e.g., a VLAN. An EVI may consist of one or more broadcast domains. In particular embodiments, an EVI may be associated with a single broadcast domain.

EVPN may provide ethernet bridging service where any device can communicate with any other device within its broadcast domain. This disclosure describes methods and apparatuses to achieve segmentation within a broadcast domain. The advantages of segmentation within a broadcast domain may be three fold: 1) may simplify provisioning where multiple, subnets can be configured in a single broadcast domain and thus avoiding per-broadcast domain configuration for each subnet, 2) may suit the hardware devices that cannot support large scale broadcast domains, and 3) may provide a path forward for segmentations not just within a broadcast domain but also within a VLAN.

FIG. 1 illustrates an example EVPN network 100 that allows segmentations with a broadcast domain. Only network entities belonging to a single broadcast domain are presented for the sake of brevity. A plurality of network apparatuses, PE1 111, PE2 112, PE3 113, and PE4 114 are connected to an EVPN network. Each network apparatus is connected to one or more customer devices. CE1 121 is connected to PE1, CE2 122 and CE5 125 are connected to PE2, CE3 123 is connected to PE3, and CE4 124 is connected to PE4. Though the network apparatuses are connected to one or two customer devices in the example illustrated in FIG. 1, typical PE nodes may be connected to a large number of CEs. A frame belonging to the broadcast domain from a customer device may be bridged through the core network to one or more destination customer devices. In the following disclosure, PE1 111 is referred to as a first network apparatus, PE2 112 is referred to as a second network apparatus, PE3 113 is referred to as a third network apparatus, and PE4 114 is referred to as a fourth network apparatus. CE1 121 is referred to as a first device, CE2 122 is referred to as a second device, CE3 123 is referred to as a third device, CE4 124 is referred to as a fourth device, and CE5 125 is referred to as a fifth device. Although this disclosure describes a particular EVPN network, this disclosure contemplates any suitable EVPN network.

In particular embodiments, devices may attach to a network apparatus through an Attachment Circuit (AC). A network apparatus may have one or more ports that are associated with ACs. Each port may be configured with a particular segment identifier. When a device is connected to a network apparatus through an AC, the network apparatus may determine the segment identifier associated with the device based on the port that the AC is connected to. As an example and not by way of limitation, illustrated in FIG. 1, the first device 121 is connected to the first network apparatus 111 through AC1 131. The segment identifier associated with the first device is 10. The second device 122 is connected to the second network apparatus 112 through AC2 132. The segment identifier associated with the second device is 10. The third device 123 is connected to the third network apparatus 113 through AC3 133. The segment identifier associated with the third device is 20. The fourth device 124 is connected to the fourth network apparatus 114 through AC4 134. The segment identifier associated with the fourth device is 20. The fifth device 125 is connected to the second network apparatus 112 through AC5 135. The segment identifier associated with the fifth device is 30. Although this disclosure describes associating a segment identifier to a device in a particular manner, this disclosure contemplates associating a segment identifier to a device in any suitable manner.

FIG. 2 illustrates an example format for a Border Gateway Protocol (BGP) extended community. The new extended community may have a Type field value of 0x06 (EVPN). Accordingly, a new Sub-Type should be defined. The last bit of the Flags field may be used as a Leaf-indication, where '1' means leaf. In particular embodiments, all ACs may be considered as "root." In such cases, only a single label per segment identifier may be needed. In particular embodiments, an AC may need to be either "root" or "leaf" in an Ethernet-Tree (E-TREE). Then, two MPLS labels per segment identifier may be needed. A segment identifier may be a 16-bit integer. In particular embodiments, a single broadcast domain may comprise a plurality of VLANs. In such cases, a 12-bit VID may be used as a segment identifier. Each advertising network apparatus may allocate one or two MILS labels for a given segment. These labels may be advertised in the leaf/root label field. When a network apparatus advertises two extended communities for a segment, one may be for <root, segment> and another for <leaf, segment>. In particular embodiments, the extended community may be advertised along with the EAD-ES route (with an ESI of zero) for BUM traffic to enable egress filtering on disposition network apparatuses. In particular embodiments, the extended community may be advertised along with the MAC/IP advertisement route for known unicast traffic. On receiving the advertisements, the receiving network apparatus may store these labels to be used when sending BUM traffic to that network apparatus. If a BUM frame arrives on a root AC, then the "root" label may be used. If the BUM frame arrives on a "leaf AC", then the "leaf" label may be used. The root or leaf label for the determined segment may be added to BUM frames. Although this disclosure describes advertising control plane information associated with a segment in a particular manner, this disclosure contemplates advertising control plane information associated with a segment in any suitable manner.

Referring again to FIG. 1, in particular embodiments, a first network apparatus 111 in a network may receive a BUM frame from a first device 121 connected to the first network apparatus 111. The BUM frame may be associated with a broadcast domain. The network may provide ethernet connectivity between sites spanning metropolitan area networks and wide area networks. In particular embodiments, the network may be an EVPN. In particular embodiments, the network may be an EVPN. As an example and not by way of limitation, the first device 121 may send an address resolution protocol (ARP) request message to determine a MAC address associated with an Internet Protocol (IP) address. An ARP request is a broadcast message. The first network apparatus 111 may receive the ARP message from the first device 121. Although this disclosure describes receiving a BUM frame from a device in a particular manner, this disclosure contemplates receiving a BUM frame from a device in any suitable manner.

In particular embodiments, the broadcast domain may be identified based on a VLAN identifier (VID) associated with the BUM frame. In particular embodiments, virtual local area network bundle service for EVPN may be utilized. In such cases, the broadcast domain is identified based on an EVPN Instance (EVI) identifier associated with the BUM frame. Although this disclosure describes identifying a broadcast domain associated with a BUM frame in a particular manner, this disclosure contemplates identifying a broadcast domain associated with a BUM frame in any suitable manner.

In particular embodiments, the first network apparatus 111 may determine a first segment within the broadcast domain associated with the first device 121. The determination of the first segment may be based on a port through which the first device 121 connects to the network apparatus. As an example and not by way of limitation, continuing with a prior example, the first device 121 connects to the first network apparatus through AC1. The port associated with AC1 is configured with segment identifier 10. Thus, the first network apparatus 111 determines that the first device 122 is associated with the segment identifier 10. Although this disclosure describes determining a segment identifier associated with a device sending a BUM frame in a particular manner, this disclosure contemplates determining a segment identifier associated with a device sending a BUM frame in any suitable manner.

In particular embodiments, the first network apparatus 111 may add a first segment identifier that uniquely identifies the first segment within the broadcast domain to the BUM frame. After the addition of the first segment identifier to the BUM frame, the BUM frame may comprise a label comprising information associated with the first segment identifier. In particular embodiments, root/leaf distinction within a segment may not be needed. In such cases, a single downstream assigned MPLS label may be used for each segment identifier. In particular embodiments, a segment may be associated with both root and leaf sites. In such cases, two downstream assigned MPLS label may be used for each segment identifier: one for root and another for leaf. As an example and not by way of limitation, continuing with a prior example, the first network apparatus 111 may add a label comprising information associated with the segment identifier 10 to the BUM frame. Although this disclosure describes adding a segment identifier to a BUM frame in a particular manner, this disclosure contemplates adding a segment identifier to a BUM frame in any suitable manner.

In particular embodiments, the first network apparatus 111 may cause the BUM frame to be delivered to one or more recipient network apparatuses in the network associated with the broadcast domain. The first network apparatus 111 may add routing information to the BUM frame. In particular embodiments, the routing information may comprise one or more MPLS labels. The one or more MPLS labels may comprise instructions for routing the BUM frame to the one or more recipient network apparatus in the broadcast domain through the EVPN network. The first segment identifier added to the BUM frame is configured to be used by the one or more recipient network apparatuses to selectively forward the BUM frame to connected devices that are with associated with the first segment identifier. As an example and not by way of limitation, illustrated in FIG. 1, continuing with a prior example, the first network apparatus 111 may forward the BUM frame through the EVPN network. The network may deliver the BUM frame to the second network apparatus, the third network apparatus and the fourth network apparatus because those network apparatuses are associated with the broadcast domain. Although this disclosure describes causing a BUM frame to be delivered to one or more recipient network apparatuses in a particular manner, this disclosure contemplates this happening in any suitable manner.

In particular embodiments, a second network apparatus 112 may receive a BUM frame originated from the first network apparatus 111. The BUM frame may comprise a broadcast domain identifier identifying the broadcast domain associated with the BUM frame and a segment identifier identifying a segment within the broadcast domain. The segment identifier may be acquired based on a label of the BUM frame. The label may be attached to the BUM frame, which is an ethernet frame. As an example and not by way of limitation, continuing with a prior example, the ARP request from the first device 121 is delivered to the second network apparatus 112. The second network apparatus 112 may determine the broadcast domain associated with the ARP request message based on the VID on the frame. The second network apparatus 112 may determine the segment associated with the ARP request message based on the segment identifier acquired from the label attached to the ARP request message. Although this disclosure describes determining a broadcast domain and a segment associated with a BUM frame upon receiving the BUM frame in a particular manner, this disclosure contemplates determining a broadcast domain and a segment associated with a BUM frame upon receiving the BUM frame in any suitable manner.

In particular embodiments, the second network apparatus 112 may compare the broadcast domain identifier of the BUM frame to one or more broadcast domain identifiers of one or more devices connected to the second network apparatus 112. As an example and not by way of limitation, illustrated in FIG. 1, the devices illustrated in FIG. 1 belong to a single broadcast domain for the sake of brevity. Thus, the second network apparatus 112 may determine that both the second device 122 and the fifth device 125 belong to the broadcast domain associated with the ARP request message. Although this disclosure describes comparing the broadcast domain identifier associated with a received BUM frame and the broadcast domain identifiers associated with connected devices in a particular manner, this disclosure contemplates comparing the broadcast domain identifier associated with a received BUM frame and the broadcast domain identifiers associated with connected devices in any suitable manner.

In particular embodiments, the second network apparatus 112 may compare the segment identifier of the BUM frame to one or more second segment identifiers of the one or more devices associated with the broadcast domain. As an example and not by way of limitation, continuing with a prior example, the second network apparatus 112 may compare the segment identifier 10 associated with the ARP request message with the segment identifier 10 associated with the second device 122 and the segment identifier 30 associated with the fifth device 125. The second network apparatus 112 may determine that only the segment identifier associated with the second device 122 matches the segment identifier associated with the ARP request message. As another example and not by way of limitation, the third network apparatus 113 may compare the segment identifier associated with the received ARP request message sent by the first device 121 with the segment identifier associated with the third device 123. The third network apparatus 113 may determine that no connected device is associated with the segment identifier associated with the ARP request message. As yet another example and not by way of limitation, the fourth network apparatus 114 may compare the segment identifier associated with the received ARP request message sent by the first device 121 with the segment identifier associated with the fourth device 124. The fourth network apparatus 114 may determine that no connected device is associated with the segment identifier associated with the ARP request message. Although this disclosure describes comparing the segment identifier associated with the received BUM frame with segment identifiers associated with connected devices in a particular manner, this disclosure contemplates comparing the segment identifier associated with the received BUM frame with segment identifiers associated with connected devices in any suitable manner.

In particular embodiments, the second network apparatus 112 may forward a copy of the BUM frame to any of the one or more devices if the second segment identifier associated with that device matches the segment identifier of the BUM frame. The second network apparatus 112 may remove the label from the BUM frame before forwarding the copy of the BUM frame. As an example and not by way of limitation, continuing with a prior example, the second network apparatus 112 takes an ethernet frame for the ARP request message by removing the label from the frame. The second network apparatus 112 forwards a copy of the ARP request message to the second device 122 because the segment identifier associated with the second device 122 matches the segment identifier associated with the ARP request message. However, the second network apparatus 112 does not forward the ARP request to the fifth device 125 because the segment identifier associated with the fifth device 125 does not match the segment identifier associated with the ARP request message. Although this disclosure describes forwarding a copy of a BUM frame to a device if the segment identifier associated with the device matches the segment identifier associated with the BUM frame in a particular manner, this disclosure contemplates forwarding a copy of a BUM frame to a device if the segment identifier associated with the device matches the segment identifier associated with the BUM frame in any suitable manner.

In particular embodiments, the third network apparatus 113 may discard the received BUM frame if no second segment identifier associated with one or more devices associated with the broadcast domain matches the segment identifier of the BUM frame. As an example and not by way of limitation, continuing with a prior example, the third network apparatus 113 does not forward the received ARP request to the third device 123 because the segment identifier associated with the third device 123 does not match the segment identifier associated with the ARP request message. The third network apparatus 113 discards the received ARP message. As another example and not by way of limitation, continuing with a prior example, the fourth network apparatus 114 does not forward the received ARP request to the fourth device 124 because the segment identifier associated with the fourth device 124 does not match the segment identifier associated with the ARP request message. The fourth network apparatus 114 discards the received ARP message. Although this disclosure describes discarding a received BUM frame in a particular manner if no connected device is associated with the segment identifier associated with the BUM frame, this disclosure contemplates discarding a received BUM frame in any suitable manner if no connected device is associated with the segment identifier associated with the BUM frame.

In particular embodiments, the first network apparatus 111 may advertise control plane information associated with the first network apparatus 111. The control plane information may be carried over BGP messages. The control plane information may comprise one or two extended communities per segment. On receiving the advertisements, the second network apparatus 112 may store the received control plane information. MAC addresses of devices should be unique across all segments for a given customer. FIG. 3 illustrates example tables constructed at network apparatuses based on control plane information. The tables illustrated in FIG. 3 are simplified for presentation purpose. In the example illustrated in FIG. 3, M1 is a MAC address associated with the first device 121. M2 is a MAC address associated with the second device 122. M3 is a MAC address associated with the third device 123. M4 is a MAC address associated with the fourth device 124. M5 is a MAC address associated with the fifth device 125. Although this disclosure describes exchanging control plane information between network apparatuses in a particular manner, this disclosure contemplates exchanging control plane information between network apparatuses in any suitable manner.

In particular embodiments, the first network apparatus 111 may receive a unicast frame from the first device 121 connected to the first network apparatus 111. The unicast frame is intended for a destination device in the broadcast domain. As an example and not by way of limitation, the first device 121 may send a unicast ethernet frame to the fifth device 125. The first network apparatus 111 may receive the unicast frame sent to the fifth device 125 from the first device 121. Although this disclosure describes receiving a unicast ethernet frame from a connected device in a particular manner, this disclosure contemplates receiving a unicast ethernet frame from a connected device in any suitable manner.

In particular embodiments, the first network apparatus 111 may determine that the first segment is associated with the unicast frame. The determination of the first segment may be based on a port through which the first device 121 connects to the first network apparatus 111. As an example and not by way of limitation, continuing with a prior example, the first network apparatus 111 determines that the unicast frame is associated with a first segment identifier "10" based on the port to which AC1 131 is connected. Although this disclosure describes determining a segment associated with a unicast frame in a particular manner, this disclosure contemplates determining a segment associated with a unicast frame in any suitable manner.

In particular embodiments, the first network apparatus 111 may selectively determine whether to forward the unicast frame towards the destination device based on a comparison between the first segment identifier associated with the first segment and a second segment identifier associated with the destination device. Information associated with the second segment identifier being associated with the destination device may be obtained from control plane information received through the network associated with the broadcast domain. The control plane information may be carried over BGP messages. As an example and not by way of limitation, continuing with a prior example, the first network apparatus 111 compares the first segment identifier "10" associated with the unicast frame and a second segment identifier "30" associated with the fifth device 125, the destination of the unicast frame. The first network apparatus 111 may determine that the first segment identifier does not match the second segment identifier. Although this disclosure describes determining whether to forward a unicast frame based on a comparison between a segment identifier associated with a unicast frame and a segment identifier associated with a destination device in a particular manner, this disclosure contemplates determining whether to forward a unicast frame based on a comparison between a segment identifier associated with a unicast frame and a segment identifier associated with a destination device in any suitable manner.

In particular embodiments, the first network apparatus 111 may discard the unicast frame without forwarding the unicast frame toward the destination device if the first segment identifier and the second segment identifier are different. As an example and not by way of limitation, continuing with a prior example, the first network apparatus discards the unicast frame received from the first device 121 without forwarding the unicast frame to the fifth device 125, the destination of the unicast frame, because the segment identifier associated with the unicast frame does not match the segment identifier associated with the destination device. Although this disclosure describes discarding a unicast frame in a particular manner, this disclosure contemplates discarding a unicast frame in any suitable manner.

Figure 4:
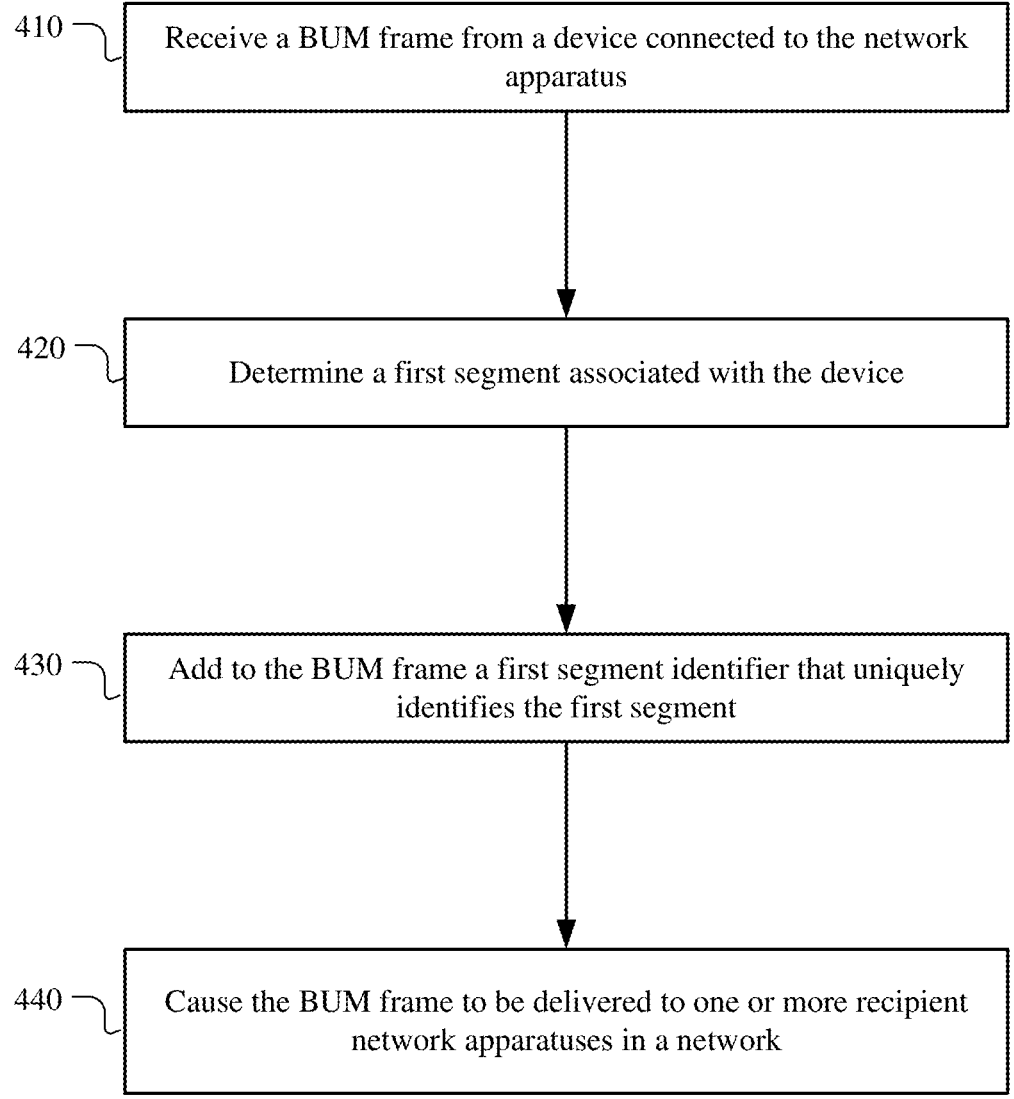
FIG. 4 illustrates an example method for forwarding a BUM frame with an added segment identifier.

FIG. 4 illustrates an example method 400 for forwarding a BUM frame with an added segment identifier. The method may begin at step 410, where a network apparatus may receive a BUM frame from a device connected to the network apparatus. The BUM frame may be associated with a broadcast domain. At step 420, the network apparatus may determine a first segment within the broadcast domain associated with the device. At step 430, the network apparatus may add to the BUM frame a first segment identifier that uniquely identifies the first segment within the broadcast domain. At step 440, the network apparatus may cause the BUM frame to be delivered to one or more recipient network apparatuses in a network associated with the broadcast domain. The first segment identifier added to the BUM frame may be configured to be used by the one or more recipient network apparatuses to selectively forward the BUM frame to connected devices that are with associated with first segment identifier. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for forwarding a BUM frame with an added segment identifier including the particular steps of the method of FIG. 4, this disclosure contemplates any suitable method for forwarding a BUM frame with an added segment identifier including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
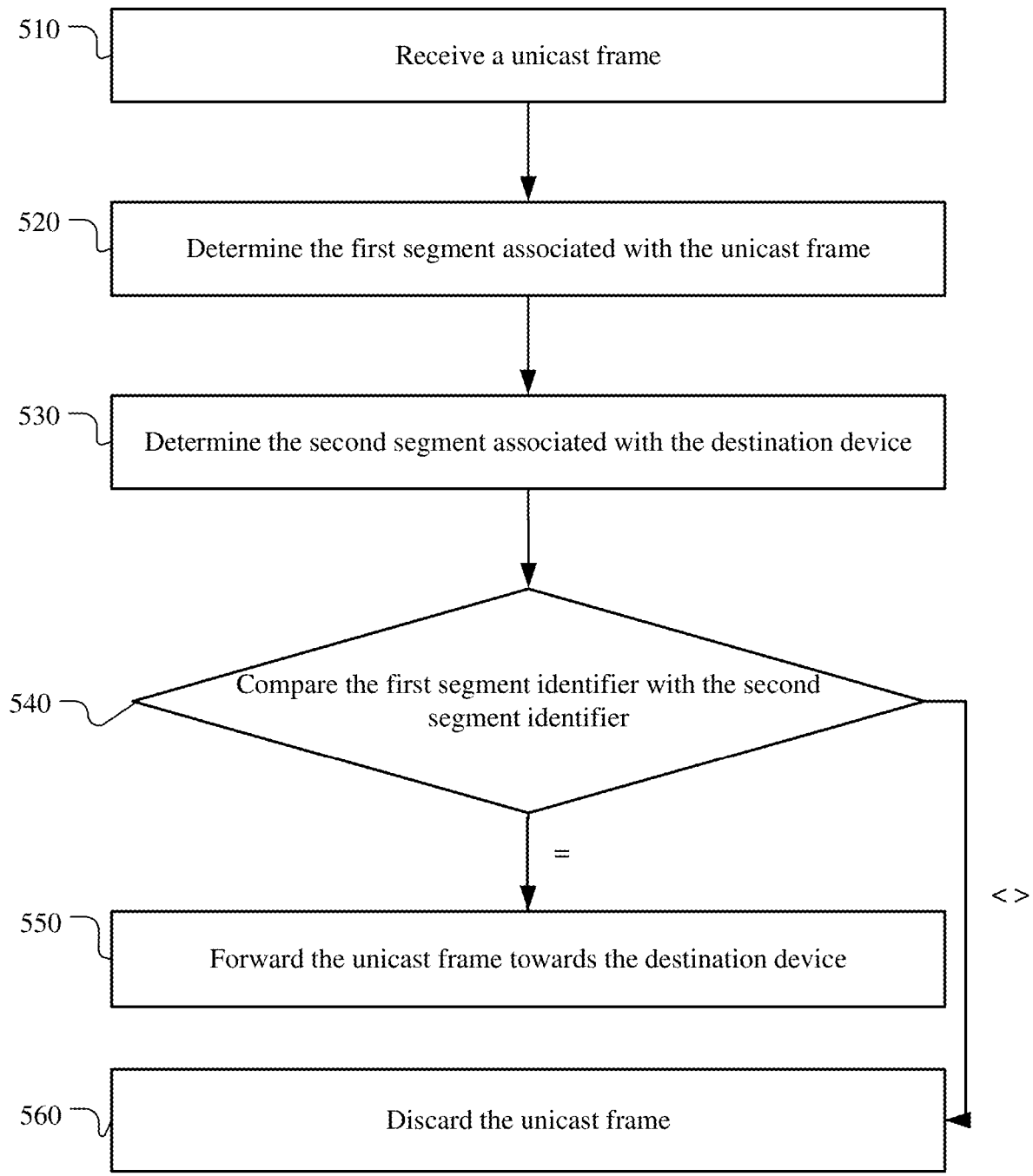
FIG. 5 illustrates an example method for selectively forwarding a unicast frame based on a comparison of segment identifier of the unicast frame to the segment identifier of the destination device.

FIG. 5 illustrates an example method 500 for selectively forwarding a unicast frame based on a comparison of segment identifier of the unicast frame to the segment identifier of the destination device. The method may begin at step 510, where a network apparatus may receive a unicast frame from the device connected to the network apparatus. The unicast frame may be intended for a destination device in the broadcast domain. At step 520, the network apparatus may determine that the first segment is associated with the unicast frame. At step 530, the network apparatus may determine that the second segment is associated with the destination device. At step 540, the network apparatus may compare the first segment identifier associated with the first segment with the second segment identifier associated with the destination device. At step 550, the network apparatus may forward the unicast frame towards the destination device if the second segment identifier matches the first segment identifier. At step 560, the network apparatus may discard the unicast frame without forwarding the unicast frame to the destination if the second segment identifier does not match the first segment identifier. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for selectively forwarding a unicast frame based on a comparison of segment identifier of the unicast frame to the segment identifier of the destination device including the particular steps of the method of FIG. 5, this disclosure contemplates any suitable method for selectively forwarding a unicast frame based on a comparison of segment identifier of the unicast frame to the segment identifier of the destination device including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
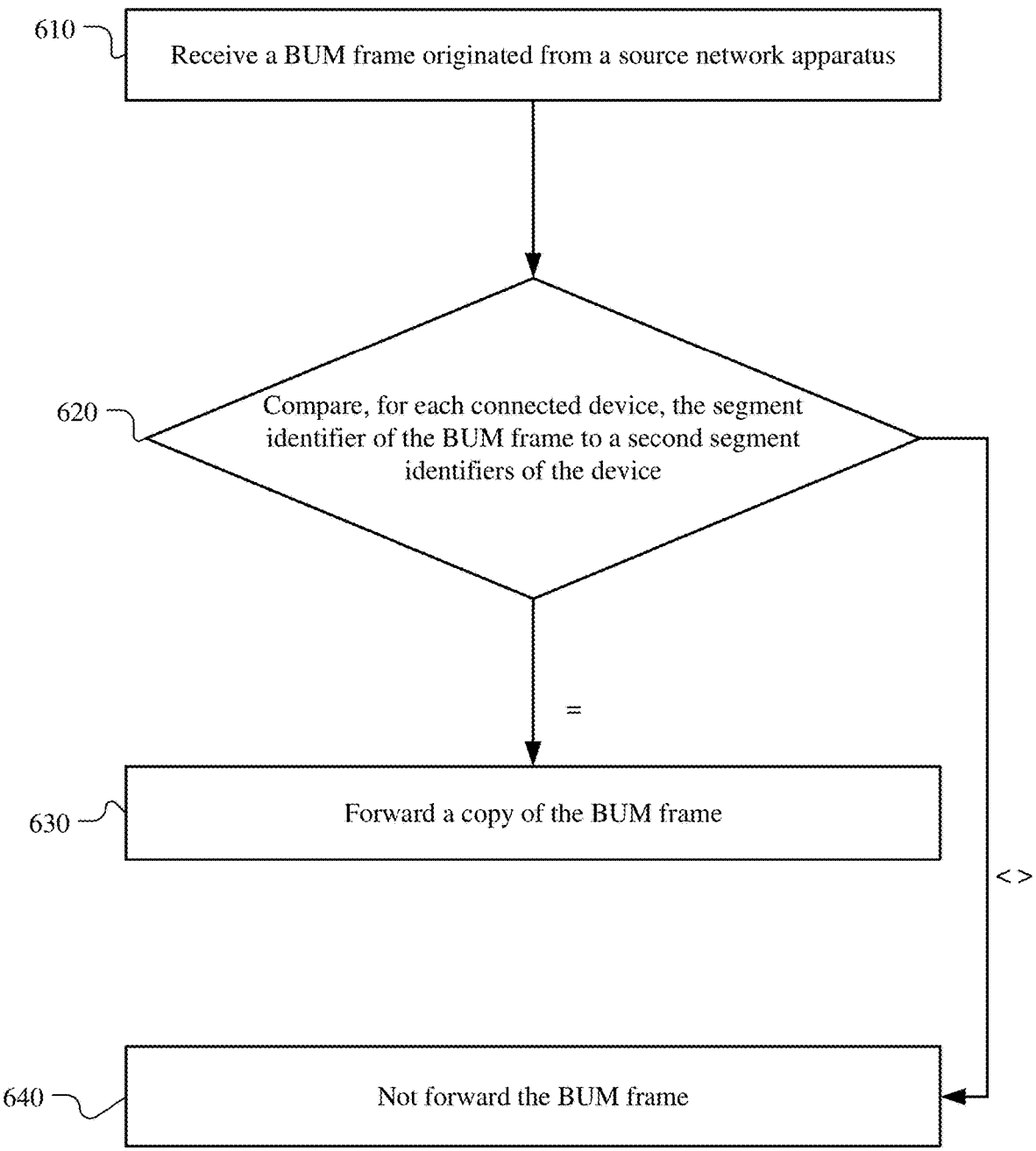

FIG. 6 illustrates an example method 600 for selectively forwarding a BUM frame to connected devices being associated with the segment that the BUM frame is associated with. The method may begin at step 610, where a network apparatus may receive a BUM frame originated from a source network apparatus. The BUM frame may be associated with a broadcast domain. The BUM frame may comprise a segment identifier identifying a segment within the broadcast domain. At step 620, the network apparatus may, for each device connected to the network device, compare the segment identifier of the BUM frame to a second segment identifier of the device. At step 630, the network apparatus may forward a copy of the BUM frame to the devices if the second segment identifier associated with that device matches the segment identifier of the BUM frame. At step 640, the network apparatus may not forward a copy of the BUM frame to the devices if the second segment identifier associated with that device matches the segment identifier of the BUM frame. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for selectively forwarding a BUM frame to connected devices being associated with the segment that the BUM frame is associated with including the particular steps of the method of FIG. 6, this disclosure contemplates any suitable method for selectively forwarding a BUM frame to connected devices being associated with the segment that the BUM frame is associated with including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
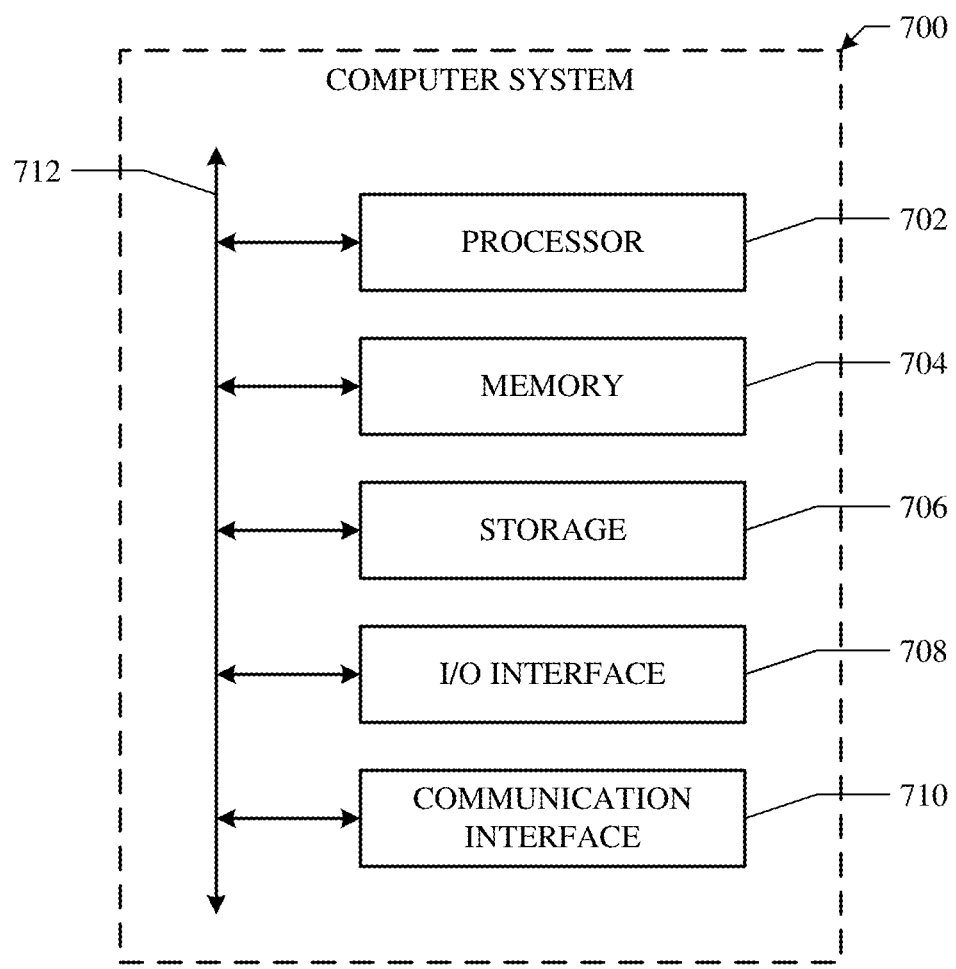
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A network apparatus, comprising:
one or more processors; and
one or more computer-readable non-transitory storage media coupled to the one or more processors and comprising instructions operable when executed by the one or more processors to cause the network apparatus to:
receive a first control plane information indicating a first device is associated with a first segment within a broadcast domain, wherein the first control plane information is received through a network associated with a broadcast domain;
store a record of an association between the first device and the first segment within the broadcast domain;
receive, from a second device connected to the network apparatus, a unicast frame destined to the first device, wherein the unicast frame is determined to be associated with a second segment within the broadcast domain based on a port through which the second device connects to the network apparatus;

determine that the second segment is identical to the first segment by looking up the stored record; and cause, in response to the determination, the unicast frame to be delivered to the first device through the network associated with the broadcast domain.

2. The network apparatus of claim 1, the one or more processors are further operable when executing the instructions to:

send a second control plane information indicating that the second device is associated with the second segment.

3. The network apparatus of claim 1, wherein the first control plane information is carried over Border Gateway Protocol (BGP) messages.

4. The network apparatus of claim 1, wherein the network is an Ethernet Virtual Private Network (EVPN).

5. The network apparatus of claim 4, wherein the network apparatus is a provider edge (PE) node of the EVPN.

6. The network apparatus of claim 4, wherein the first device and the second device are customer edge (CE) devices of the EVPN.

7. The network apparatus of claim 4, wherein the first control plane information is advertised along with an Ethernet Auto Discovery Route per Ethernet Segment (EAD-ES route).

8. The network apparatus of claim 4, wherein the first control plane information is advertised along with a Media Access Control (MAC)/Internet Protocol (IP) advertisement route.

9. The network apparatus of claim 4, wherein the broadcast domain is identified based on an EVPN Instance (EVI) identifier associated with the unicast frame.

10. The network apparatus of claim 1, wherein the record is stored to a bridge table associated with the broadcast domain.

11. The network apparatus of claim 1, wherein the broadcast domain is associated with a plurality of virtual local area network (VLAN) identifiers.

12. The network apparatus of claim 11, wherein shared VLAN learning (SVL) is used for the broadcast domain.

13. A method comprising, by a network apparatus:

receiving a first control plane information indicating a first device is associated with a first segment within a broadcast domain, wherein the first control plane information is received through a network associated with a broadcast domain;

storing a record of an association between the first device and the first segment within the broadcast domain;

receiving, from a second device connected to the network apparatus, a unicast frame destined to the first device, wherein the unicast frame is determined to be associated with a second segment within the broadcast domain based on a port through which the second device connects to the network apparatus;

determining that the second segment is identical to the first segment by looking up the stored record; and causing, in response to the determination, the unicast frame to be delivered to the first device through the network associated with the broadcast domain.

14. The method of claim 13, further comprising:

sending a second control plane information indicating that the second device is associated with the second segment.

15. The method of claim 13, wherein the first control plane information is carried over Border Gateway Protocol (BGP) messages.

16. The method of claim 13, wherein the network is an Ethernet Virtual Private Network (EVPN).

17. The method of claim 16, wherein the network apparatus is a provider edge (PE) node of the EVPN.

18. The method of claim 16, wherein the first device and the second device are customer edge (CE) devices of the EVPN.

19. The method of claim 16, wherein the first control plane information is advertised along with an Ethernet Auto Discovery Route per Ethernet Segment (EAD-ES route).

20. One or more computer-readable non-transitory storage media embodying software that is operable when executed, by a network apparatus, to:

receive a first control plane information indicating a first device is associated with a first segment within a broadcast domain, wherein the first control plane information is received through a network associated with a broadcast domain;

store a record of an association between the first device and the first segment within the broadcast domain;

receive, from a second device connected to the network apparatus, a unicast frame destined to the first device, wherein the unicast frame is determined to be associated with a second segment within the broadcast domain based on a port through which the second device connects to the network apparatus;

determine that the second segment is identical to the first segment by looking up the stored record; and cause, in response to the determination, the unicast frame to be delivered to the first device through the network associated with the broadcast domain.

* * * * *